United States Patent
Passino et al.

(10) Patent No.: US 6,907,773 B2
(45) Date of Patent: Jun. 21, 2005

(54) METHOD OF INDEPENDENTLY MEASURING BEARING PRELOAD IN AN AXLE ASSEMBLY

(75) Inventors: Ben J. Passino, Fort Wayne, IN (US); Michael J. Catalano, Fort Wayne, IN (US); Ken E. Cooper, Fort Wayne, IN (US); Todd A. Smith, Fort Wayne, IN (US)

(73) Assignee: Torque-Tracton Technologies, Inc., Maumee, OH (US)

( * ) Notice: Subject to any disclaimer, the term of this patent is extended or adjusted under 35 U.S.C. 154(b) by 128 days.

(21) Appl. No.: 10/077,905

(22) Filed: Feb. 20, 2002

(65) Prior Publication Data

US 2003/0154775 A1 Aug. 21, 2003

(51) Int. Cl.[7] .............................................. G01M 19/00
(52) U.S. Cl. ..................................................... 73/118.1
(58) Field of Search ........................... 73/118.1, 9, 146, 73/162; 418/206.1; 475/5, 3.45, 301; 29/724, 898.09

(56) References Cited

U.S. PATENT DOCUMENTS

| | | | |
|---|---|---|---|
| 3,298,228 A | | 1/1967 | Oltean et al. |
| 3,715,909 A | | 2/1973 | Wolanin |
| 4,788,856 A | | 12/1988 | Felger |
| 5,125,156 A | | 6/1992 | Witte |
| 5,573,472 A | * | 11/1996 | Ciolli .......................... 475/301 |
| 5,579,570 A | | 12/1996 | Bonvallet |
| 6,000,134 A | | 12/1999 | Jerraid |
| 6,088,910 A | | 7/2000 | Jerraid |
| 6,446,339 B2 | * | 9/2002 | Takamizawa et al. .... 29/898.09 |

* cited by examiner

Primary Examiner—Edward Lefkowitz
Assistant Examiner—Octavia Davis
(74) Attorney, Agent, or Firm—Liniak, Berenato & White

(57) ABSTRACT

A method and apparatus to independently measure the bearing pre-load of a pinion gear and differential case an assembled axle assembly. The ring gear and pinion gear are positioned within a backlash so that there is no engagement therebetween. The pinion shaft and differential case are rotated independently in synchronization maintaining the relative positions and the torque to rotate the pinion shaft and differential case are independently measured.

5 Claims, 1 Drawing Sheet

METHOD OF INDEPENDENTLY MEASURING BEARING PRELOAD IN AN AXLE ASSEMBLY

FIELD OF THE INVENTION

The present invention is directed to a method of measuring bearing pre-load and is particularly directed to independently measuring a pre-load of a pinion gear and ring gear in an assembled axle assembly.

DESCRIPTION OF THE PRIOR ART

Axle assemblies of the prior art include a differential case rotatably mounted in the housing of the axle assembly. A ring gear is often formed on an outer peripheral surface to interface with a pinion gear to drive the ring gear and provide power to the axles. The pinion gear is driven by a pinion shaft which is also rotatably mounted to the housing. Both the differential case and pinion shaft are rotatably mounted to the housing through bearing assemblies. It is important to ensure that the preload of these bearing assemblies are established within specific tolerances to enable the axle assembly to perform properly. Each of these separate bearing assemblies likely requires different preloads. Heretofore, there has been no way to independently and accurately measure these bearing preloads which are completely assembled in the axle assembly.

In the prior art, there are techniques for measuring the preload across the entire axle assembly, thee sum of the preloads of the pinion bearing assembly and case bearing assembly. Other methods require partial disassembly of the axle assembly to independently measure one of the bearing assemblies apart from the other. However, this is considerably undesirable as complete disassembly and partial reconstruction would be needed to measure the preload of the second bearing assembly. While the pre-load of the second bearing assembly can be estimated by subtracting the preload of the first bearing assembly from the pre-load of the overall assembly, such does not facilitate independently measuring the pre-load of one of the bearing after some use as the pinion torque to rotate changes the more the pinion bearings rotate, thus an accurate measurement of the differential torque to rotate (preload) cannot be accurately measured.

SUMMARY OF THE INVENTION

The present invention is directed to a method and apparatus to independently measure the bearing preload (or torque to rotate) a pinion gear and differential case with associated ring gear in an assembled axle assembly. A backlash between the mating teeth of the ring gear and pinion gear are measured. The ring gear and pinion gear are then positioned intermediate the measured backlash so that no teeth engage or contact each other. The pinion shaft and differential case are rotated in synchronization maintaining the relative positions and the torque to rotate the pinion shaft and differential case are independently measured. Because the ring gear and pinion gear do not touch each other, accurate independent measures of each preload can be obtained. After the independent preloads are measured, the ring gear is allowed to freely rotate being driven by the pinion gear and the overall torque to rotate the entire axle assembly can be measured.

DETAILED DESCRIPTION OF THE PREFERRED EMBODIMENT

Figure 1:
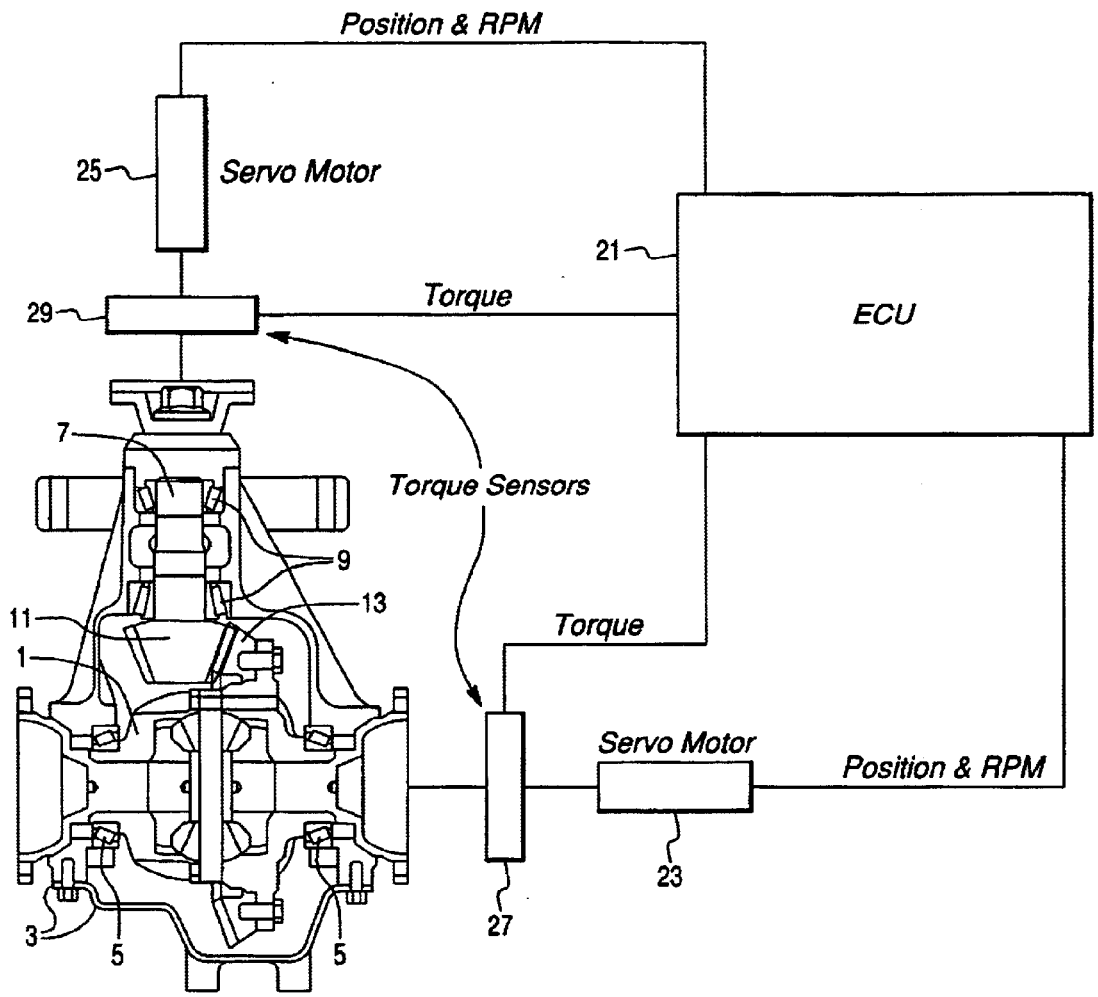
FIG. 1 is a partial sectional/schematic view of the apparatus employed to measure bearing preload according to the present invention.

FIG. 1, depicts a conventional axle assembly having a differential case 1 rotatably mounted in a housing 3 via bearings 5. A pinion shaft 7 is also rotatably mounted within housing 3 via a second set of bearings 9. A pinion gear 11 engages a ring gear 13 secured to the differential case 1. Rotation of the pinion shaft 7 drives the differential case 1 via an interface between ring gear 13 and pinion gear 11 as is conventionally known in the art. The differential case provides a differential rotational drive between the pinion shaft and two output shafts (not shown).

In order for the axle assembly to operate properly, the entire axle assembly must be assembled such that the bearings preload are within a prescribed tolerance. Thus, it is important to independently measure the preload of bearings 9 supporting the pinion shaft 7 and the preload of the bearings 5 supporting the differential case 1. The bearing preload is measured by measuring the torque to rotate the pinion shaft 7 and ring gear 13/differential case 1.

In order to independently measure the torque to rotate the pinion shaft 7 and ring gear 13, the ring gear 13 and pinion shaft must be isolated from each other while being rotated. In other words, the teeth of the ring gear 13 and pinion gear 11 must not engage each other during rotation when measuring the respective torques to rotate the pinion shaft 7 and ring gear 13. Thus, no effect of the rotational resistance of one shaft will effect the resistance of the other.

The pinion gear 11 and ring gear 13 are driven in synchronization such that respective teeth of each gear do not engage each other. An ECU controlling driving motors with speed/position sensors are employed to controllably rotate the gears in synchronicity, the details of which will be later explained. However, prior to driving the gears 11/13, the ring gear 13 and pinion gear 11 must be positioned such that they do not touch each other.

Figure 2:
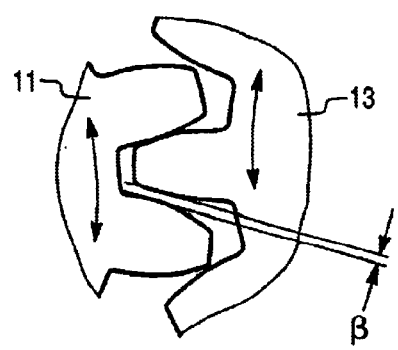
FIG. 2 is a view of corresponding meshing gear teeth and associated backlash.

FIG. 2 represents an enlarged view of the pinion gear 11/ring gear 13 interface. Preferably, the pinion gear 11 is held stationary and the ring gear 13 is rotated until tooth contact is established. The ring gear is then driven backward until the corresponding tooth of the ring gear engages the adjacent tooth of the pinion shaft. The rotation of the ring gear is measured indicative of the backlash between teeth of the ring gear 13 and pinion gear 11. To ensure that the measured backlash is accurate, the backlash is measured in a plurality of locations about the ring gear. Taking more measurements will increase accuracy. If a large discrepancy is noticed, the smallest measurement of backlash will be utilized to position ring gear 13 relative to the pinion gear 11. Moreover, if such discrepancies are notice, more measurements should be taken to ensure that the ring gear is positioned within the smallest backlash and eliminate the possibility of tooth contact during rotation. The measurements should be taken at increments equally spaced apart about the ring gear. The ring gear is simply rotated to subsequent positions and the backlash measured and recorded. It is possible to measure the backlash between each tooth of the ring gear, however such is not usually necessary. The number of measurements need only ensure that an accurate measurement of the backlash is determined.

Specifically, the pinion shaft is rotated until it contacts the ring gear. The pinion shaft is then rotated a precise number of rotations at fixed speed. Preferably, the pinion shaft is precisely rotated a number of revolutions in proportion to the gear ratio with the ring gear such that the ring gear rotates 360 degrees. The position of the ring gear is noted in minutes. The pinion shaft is then reverse rotated precisely the number of revolutions initially rotated and the ring gear rotation is measured in minutes. The maximum, minimum, and average ring gear backlash can be determined based on the difference between the ring gear's position after initially rotating the pinion shaft and the subsequent position after reversely rotating the pinion shaft.

Once having measured the backlash, the ring gear 13 is rotated to engage the pinion gear 11. The ring gear 13 is then rotated backwards ½ the distance of the measured backlash so that corresponding teeth of the ring gear 13 and pinion gear 11 are disposed intermediate of the backlash and do not contact one another. The ring gear 13 and pinion gear 11 are then simply rotated in synchronization so that no teeth of one gear ever engage the other. In effect, the ring gear 13 and pinion gear 11 are rotated simultaneously in isolation from one another. The torque to rotate each respective gear may then be simply measured giving an independent and accurate measurement of the bearing pre-load of each bearing set.

In order to rotate the ring gear 11 and pinion gear 13 in synchronicity, the pinion shaft 7 and differential case 1 must be precisely rotated. An electronic control unit 21 is employed to precisely control a pair of electrical motors 23/25 (or other electronically controlled driving device) which respectively drive the differential case 1 and pinion shaft 7. It is appreciated that one of ordinary skill in the art is fully capable of creating a driving connection between the motors 23, 25 and pinion shaft 7 and differential case 1 the details of which need not be described. So long as a controlled device precisely drives the differential case 1 and pinion shaft 7, the exact driving mechanism is not essential to the method of measuring the torque to rotate the respective gears. In order to precisely control the motors 23, 25 some type of speed/rotational position sensor is needed to always know the positional and rotational speed of the pinion gear 11 and ring gear 13. These sensors are schematically represented by reference numeral 27, 29. Preferably each drive motor 23, 25 will have an associated rotary encoder 27, 29 to cooperate with the control mechanism 21 (ECU) to achieve the desired synchronization rotation of the ring gear 13 and pinion gear 11. Off course, it is understood, that other types of sensors, may be employed so that the control unit precisely understands the speed and rotational position of each shaft and thus gears at al all times. Such sensors or encoders for example may form an integral part of the drive device employed.

It is also worth noting, the in order to synchronize the rotational speed of the ring gear 13 and pinion gear 11, the number of working teeth of each gear must be known. For example, if the number of ring gear teeth equals the number of pinion gear teeth, then the two gears will be rotated at precisely the same speed. However, should the number of teeth differ, as often is the case, the respective rotational speeds will need to be appropriately adjusted in accordance with the gear ratio. Often, the number of teeth of the pinion gear will be smaller than the number of teeth of the ring gear. Consequently, the pinion shaft must be appropriated at a faster speed. The ability to appropriately adjust the relative rotational speeds according to the specific gear ratios is believed to be well within the knowledge of one ordinary skill in the art.

Moreover, the precise mechanism to measure the torque to rotate the respective ring gear 13 and pinion gear 11 is not essential to the method of the present invention, so long as the torque to rotate the differential case 1 and pinion shaft 7 may be obtained while rotating the respective shafts. For example, the driving motors may be so equipped to measure the rotational loads endured.

While the foregoing invention has been shown and described with reference to a preferred embodiment, it will be understood by those possessing skill in the art that various changes and modifications may be made without departing from the spirit and scope of the invention. For example, while the preferred embodiment is employed for independently measuring the preload in bearings in an axle assembly, the method of the present invention may be so employed in other gear assemblies where isolation of driven members is required to independently measure the torque to rotate those members. Moreover, it is understood that the present invention is not limited to a specific means to measure the torque to rotate a shaft. It is within the knowledge of one of ordinary skill in the art to measure the torque to rotate a pinion shaft across an entire differential assembly. The present invention provides the ability to isolate the pinion shaft from the ring gear such that independent torque measurements can be accurately measured.

What is claimed is:

1. A method of measuring bearing preload of a ring gear and a pinion gear in an axle assembly, said method comprising the steps of:

positioning said ring gear and said pinion gear within a backlash therebetween so that said ring gear and said pinion gear do not contact each other;

rotating said ring gear and said pinion gear independently in synchronization to maintain a relative rotational position of said ring gear to said pinion gear within said backlash so that said ring gear and said pinion gear do not contact each other; and measuring a torque to rotate said ring gear and a second torque to rotate said pinion gear while rotating said ring gear and pinion gear in synchronization.

2. The method according to claim 1, wherein said step of positioning said ring gear and said pinion gear further comprises the steps of:

firstly rotating at least one of said ring gear and pinion gear so that corresponding teeth engage each other, secondly rotating at least one of said ring gear and said pinion gear so that successive teeth engage each other;

determining said backlash by measuring a distance to secondly rotate said at least one ring gear and pinion gear;

thirdly rotating said ring gear and said pinion gear relative to one another so that corresponding teeth are disposed intermediate said backlash.

3. A method of independently measuring bearing preload of bearings supporting a first and second gear in driving engagement in a gear assembly, said method comprising the steps of:

positioning said first gear and said second gear within a backlash therebetween so that said first gear and said second gear do not contact each other;

rotating said first gear and said second gear independently in synchronization to maintain a relative rotational position of said first gear to said second gear within said backlash so that said first gear and said second gear do not contact each other; and independently measuring a first torque to rotate said first gear and a second torque to rotate said second gear while rotating said first gear and second gear in synchronization.

4. The method according to claim 3, wherein said step of positioning said first and second gears further comprises the steps of:

firstly rotating at least one of said first and second gears so that corresponding teeth engage each other, secondly rotating at least one of said first and second gears so that successive teeth engage each other;

determining said backlash by measuring a distance to secondly rotate said at least one of said first and second gears;

thirdly rotating said first and second gears relative to one another so that corresponding teeth are disposed intermediate said backlash.

5. A method of isolating corresponding teeth in successive gears in a gear assembly, said method comprising the steps of:

firstly rotating at least one of said successive gears so that said corresponding teeth engage each other, secondly rotating at least one of said successive gears so that successive teeth of said corresponding teeth engage each other;

determining a backlash between said corresponding gears by measuring a distance to secondly rotate said one of said successive gears; and thirdly rotating at least one of said successive gears so that corresponding teeth are disposed intermediate said backlash; and independently rotating said successive gears in synchronization to maintain a relative rotational position of said successive gears such that successive teeth of said corresponding teeth remain within said backlash and no teeth between successive gears contact one another.

* * * * *